(12) United States Patent
Snyder et al.

(10) Patent No.: US 6,640,255 B1
(45) Date of Patent: Oct. 28, 2003

(54) METHOD AND APPARATUS FOR GENERATION AND INSTALLATION OF DISTRIBUTED OBJECTS ON A DISTRIBUTED OBJECT SYSTEM

(75) Inventors: Alan Snyder, Palo Alto, CA (US); Roderick J. Mc Chesney, Redwood City, CA (US); Mark W. Hapner, San Jose, CA (US); Arthur A. Van Hoff, Palo Alto, CA (US); Maurice Balick, Fairhaven, MD (US); Raphael Bracho, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 08/414,240

(22) Filed: Mar. 31, 1995

(51) Int. Cl.$^7$ ................................................. G06F 9/44
(52) U.S. Cl. ....................................................... 709/315
(58) Field of Search ................................. 395/700, 680, 395/683; 709/300, 303, 315, 316, 310, 100

(56) References Cited

U.S. PATENT DOCUMENTS

| | | | | |
|---|---|---|---|---|
| 5,446,902 A | * | 8/1995 | Islam | 495/700 |
| 5,450,583 A | * | 9/1995 | Inada | 395/650 |
| 5,473,777 A | * | 12/1995 | Moeller et al. | 395/700 |
| 5,475,817 A | * | 12/1995 | Waldo et al. | 395/650 |
| 5,493,680 A | * | 2/1996 | Danforth | 395/700 |
| 5,509,123 A | * | 4/1996 | Dobbins et al. | 395/200.15 |
| 5,530,861 A | * | 6/1996 | Diamant et al. | 395/650 |
| 5,583,983 A | * | 12/1996 | Schmitter | 395/705 |

OTHER PUBLICATIONS

W. Rosenberry et al "Distributing Applications Across DCE and Windows NT", O'Reilly & Associates, Inc., pp135–140, 1993.*

R. Orfali, D. Harkey, Client/Server Programming with OS/2 2.1, third edition, Van Nostrand Reinhold, pp. 39–41, 1993.*

Object Management Group, Inc., The Common Object Request Broker: Architecture and Specification, Revision 1.1, X/Open Company Ltd. pp27–44, Dec. 1, 1991.*

J. M. Richter, Windows 3.1: A Developer's Guide, 2nd ed. Chapter 2: Subclassing and Superclassing Windows, M&T Books, pp. 63–123, 1992.*

IBM Corporation, SOMobjects Developer Toolkit Users Guide, Oct. 1994, Version 2.1, chapters 4 & 5.

Bjarne Stroustrup, The C++ Programming Language, Second Edition, 1992.

Mark Betz, OMG's CORBA, Dr. Dobb's Special Report, Winter 1994/95, pp. 8–12.

* cited by examiner

*Primary Examiner*—Sue Lao
(74) *Attorney, Agent, or Firm*—Beyer Weaver & Thomas, LLP

(57) ABSTRACT

A method and apparatus for installing distributed objects on a distributed object system is described. In one aspect the distributed objects include wrapper classes that inherit object attributes through an inheritance relationship with a developer-written servant class of objects, the developer-written servant classes inheriting attributes through an optional inheritance relationship with an interface class of objects. In a preferred embodiment, the wrapper classes provide an interface mechanism between the methods of the servant class of objects and the object request broker mechanism of the distributed object system. Also included is an apparatus for creating and installing the distributed object in the memory of a computer on a distributed object system. The invention further includes a mechanism for distinguishing deployed distributed objects from development distributed objects.

43 Claims, 12 Drawing Sheets

```
F() {
    ...
    ...
    ...
}
```

```
Dist_Obj_F(){
    Wrapper_Stmt_A
    Wrapper_Stmt_B
    Call F()
    Wrapper_Stmt_C
    Wrapper_Stmt_D
}
```

METHOD AND APPARATUS FOR GENERATION AND INSTALLATION OF DISTRIBUTED OBJECTS ON A DISTRIBUTED OBJECT SYSTEM

BACKGROUND OF THE INVENTION

1. The Field of the Invention

The present invention relates to the fields of distributed computing systems, client-server computing and object-oriented programming. More specifically, the present invention includes a method and apparatus for creating and installing objects on a distributed object system.

2. The Relevant Art

Object oriented programming methodologies have received increasing attention over the past several years in response to the increasing tendency for software developed using traditional programming methods to be delivered late and over budget. One problem with traditional programming techniques stems from the emphasis placed on procedural models and "linear" code that often is extremely difficult to design and maintain. Generally, large programs created using traditional methods are "brittle", that is, even small changes can affect all elements of the programming code. Thus, minor changes made to the software in response to user demands can require major redesign and rewriting of the entire program.

Object oriented programming strategies tend to avoid these problems because object methodologies focus on manipulating data rather than procedures; thus providing the programmer with a more intuitive approach to modeling real world problems. In addition objects encapsulate related data and procedures so as to hide that information from the remainder of the program by allowing access to the data and procedures only through the object's interface. Hence changes to the data and or procedures of the object are relatively isolated from the remainder of the program. This provides code that is more easily maintained as compared to code written using traditional methods, as changes to an object's code do not affect the code in the other objects. In addition, the inherent modular nature of objects allows individual objects to be reused in different programs. Thus, programmers can develop libraries of "tried and true" objects that can be used over and over again in different applications. This increases software reliability while decreasing development time, as reliable programming code may be used repeatedly.

The object metaphor in distributed systems is a useful technique as it separates the object's interface from its implementation; thus allowing software designers to take advantage of the functionalities of various objects available to them without having to worry about the details of the object's implementation. The programmer need only be aware of the object's interface. In addition, object oriented distributed systems allow for multiple implementations of a single interface, which interface may reside on different computing platforms that have been connected through a network. Thus, a programmer working on one machine of a network may make a call to an object about which the programmer has no detailed knowledge with the confidence that at the appropriate time that the remote object will be accessed and return its data so that the programmers code will function properly. Such a system thus maximizes the inherent advantages of object oriented methodologies by taking full advantage of their modularity and encapsulation.

Attempts to provide such facilities have been made using object oriented distributed systems that are based upon a client-server model, in which object-servers provide interfaces to clients that make requests of the object-servers. Typically in such systems, these servers are objects consisting of data and associated methods. The clients obtain access to the functionalities of the object-servers by executing calls on them, which calls are mediated by the distributed system.

When the object-server receives the call it executes the appropriate method and transmits the result back to the object-client. The client and object-server communicate through an Object Request Broker (ORB) which is used to locate the various distributed objects and establish communications therebetween.

Although the advantages to employing object oriented programming methodologies through distributed object systems are significant, there remain major hurdles to their implementation. An extremely difficult hurdle stems from the increased demand on object programmers to provide the functionalities in their code necessary to make their objects perform properly on the distributed object system. For example, objects in the distributed object system must be capable of activation and deletion by the ORB in response to uncoordinated and often concurrent requests from clients. Objects must also be capable of responding to multiple simultaneous requests, i.e., they must be capable of supporting multithreaded operation.

Unfortunately, most programming objects currently in existence are not written to support the functionalities required for placement on a distributed operating system. Thus, the implementation of existing objects on such systems would require much retooling of the existing object software. This would lessen the advantages afforded by object programming methodologies as existing programming objects would not be easily available in distributed object systems.

An additional difficulty with implementing distributed objects on distributed object systems arises from the need to inform the system of the presence of the objects at the time of their installation. Since all client requests are processed through the object request broker, or ORB, the ORB must have knowledge of the existence of the objects. Furthermore, it is preferable in distributed object systems to have functionalities that allow for a clear distinction between objects that are in the development phase and objects that are available to users on the distributed object system generally. Providing such awareness poses various difficulties for the programmer who must bear the burden of implementing a wide variety of "housekeeping" operations to take advantage of the benefits of the distributed object system.

The full promise of object oriented methodologies, especially the advantages afforded by their modularity, have yet to be achieved. In particular, it would be highly desirable to allow programmers and other users the ability to create and install distributed objects in a relatively transparent fashion so that objects created in different programming languages and/or objects residing on different computing platforms can be made available on distributed object systems without extensive modification of programming code or placing an undue burden on the user. Thus, it would be preferable to have a system capable of handling the formation and installation of distributed objects that minimizes the need for the programmer or the user to be familiar with the details of distributed object systems. More preferable is a system in which programming objects that are not distributed can be transformed into a distributed object relatively transparently with respect to the programmer or the user.

SUMMARY OF THE INVENTION

The present invention includes a method and apparatus for forming and installing distributed objects in a distributed object system. Using the method and apparatus of the invention distributed objects can be formed and installed on distributed object systems without extensive modification to the objects and without the requirement that the programmer or user of the object have an extensive familiarity with providing support for distributed object systems in the programming code of their objects. Thus, using the method and apparatus of the invention objects can be brought onto a distributed object system with greater efficiency and ease than heretofore available.

In one embodiment, the present invention provides a computer-implemented method for creating a distributed object suitable for use on a distributed object system. The method of the invention includes the steps of first providing interface files describing interfaces contained in the distributed object, providing implementation files describing distributed object implementations, providing servant class files describing a servant class of object implementations, and optionally providing data schema files describing persistent data. The interface, implementation, servant class and persistent data schema files are compiled under computer control to produce compiled header and source files corresponding to the interface, implementation, servant class and persistent data schema files, in which the source files corresponding to the implementation files include template source files. Finally, the header and source files are linked under computer control with the wrapper class so that the wrapper class has an inheritance relationship with respect to the servant class wherein the wrapper class is derived from the servant class to create thereby the distributed object.

In one embodiment, the method further includes the steps of discriminating between a distributed object intended for development and a distributed object intended for deployment. The header and source files for distributed objects intended for development are linked with a development object file. Distributed objects that are intended for deployment are packaged and an interface registry file is created for registration with the object request broker mechanism of the distributed object system.

In another embodiment, the present invention includes a computer system for producing a distributed object suitable for use on a distributed object system. The computer system of the invention includes a compiling mechanism for compiling interface definition files including object interface definitions, implementation files describing distributed object implementations and servant class files of developer-defined object implementations to produce corresponding header and source files. The computer system further includes a linking mechanism to link the source and header files produced by the compiling mechanism with a wrapper class containing functions and services for operating the distributed object on the distributed object system. The linker is effective to establish an inheritance relationship between the wrapper class and the servant class in which the wrapper class is derived from the servant class. In one embodiment, the computer system of the invention includes a compiling mechanism and a linking mechanism effective to produce a template file containing a prototypical version of the servant class.

In still another embodiment the present invention includes a distributed object suitable for use on a distributed object system. The distributed object includes a call to a developer-written function that is contained in a servant class containing developer-written code. In addition, the distributed object of the invention further includes wrapper statements contained in a wrapper class of objects. The wrapper statements include invocations of services for supporting the operation of the distributed object on the distributed object system. The wrapper class has an inheritance relationship with the servant class wherein the wrapper class is derived from the developer-written servant class of objects.

In another embodiment, the servant class of the distributed object of the invention inherits from an interface class of interfaces to services contained in the wrapper class. A preferred embodiment is one wherein the distributed object is located in the memory of a computer in a distributed object system wherein the distributed object of the invention communicates with other distributed objects through an object request broker mechanism. In one embodiment, the services provided by the wrapper class provide an interface mechanism between the developer-written methods contained in the servant class and the object request broker mechanism.

Further advantages and features of the present invention will become apparent when the detailed description below is read in conjunction with the accompanying figures.

BRIEF DESCRIPTION OF THE DRAWINGS

FIG. 7A illustrates a developer written function. FIG. 7B represents the wrapping of a developer written-function of FIG. 7A by wrapper statements to produce a method function in accordance with the present invention.

DESCRIPTION OF SPECIFIC EMBODIMENTS

I. DEFINITIONS

Figure 1:
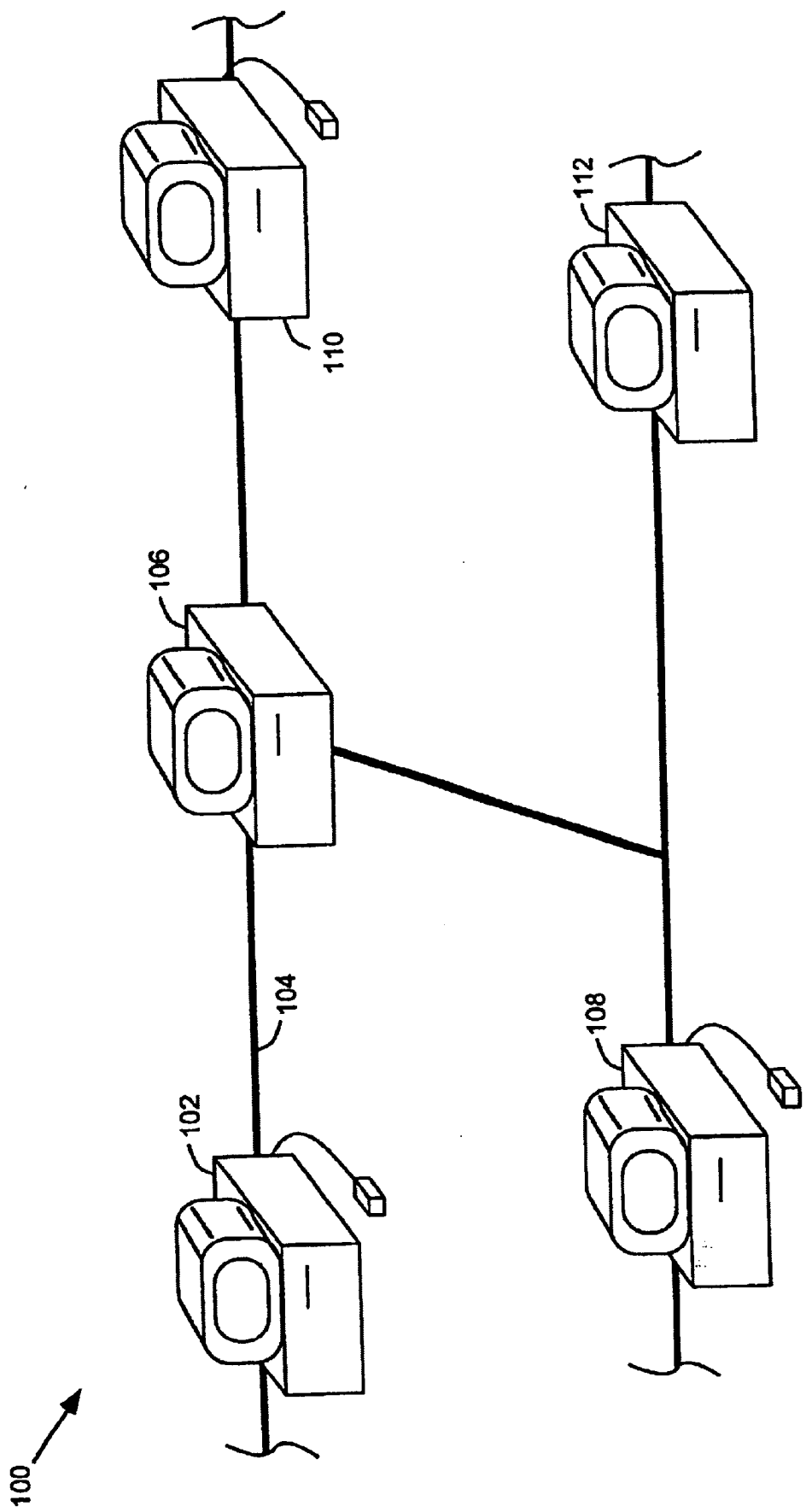
FIG. 1 is an illustration of a computer network supporting a distributed object system.

As used herein, the term "distributed object" or "object" refers to an encapsulated package of code and data that can be manipulated by operations defined in the interface of the distributed object. Thus, distributed objects will be seen by those skilled in the art as including the basic properties that define traditional programming objects. However, distributed objects differ from traditional programming objects by the inclusion of two important features. First, distributed objects are multilingual. The interfaces of distributed objects are defined using an interface definition language that can be mapped to a variety of different programming languages. One such interface definition language is IDL. Second, distributed objects are location-independent, i.e., distributed objects can be located anywhere in a network. This contrasts sharply with traditional programming objects which typically exist in a single address space: the address space of the client. Distributed objects can be object-clients or object-servers, depending upon whether they are sending requests to other objects or replying to requests from other objects. Requests and replies are made through an object request broker (ORB) that is aware of the locations and status of the objects.

A "distributed object system" or "distributed object environment" refers to a system comprising remote objects that communicate through an ORB that is aware of the locations and status of the objects in the distributed object system. In a preferred embodiment, objects communicate using the methods described in co-pending U.S. patent application Ser. No. 08/408,317, entitled "Methods and Apparatus for Managing Collections of Objects", by Dwight F. Hare, et al., filed Mar. 22, 1995; U.S. patent application Ser. No. 08/408, 316 entitled "Method and Apparatus for Managing Connections for Communication Among Objects in a Distributed Object System" by David Brownell, et al., filed Mar. 22, 1995; U.S. patent application Ser. No. 08/408,954 entitled "Methods, Apparatus and Data Structures for Managing Objects" by David Brownell, et al., filed Mar. 22, 1995; and U.S. patent application Ser. No. 08/408,645, entitled "Methods and Apparatus for Managing Computer Processes" by Anthony Menges, et al., filed Mar. 22, 1995. Each of these U.S. Patent Applications is incorporated herein by reference in its entirety.

A preferred system architecture for implementing such an ORB is provided by the Common Object Request Broker Architecture (CORBA) specification. The CORBA specification is defined by the Object Management Group (OMG). Under the CORBA, a distributed object system is defined in terms of a client-server model wherein target objects, or servers, provides services to clients that request such services.

An "object reference" or "objref" contains a pointer to another object. The creation and definition of object references will be familiar with those skilled in the art.

A "client" as defined herein refers to an entity that sends a request to an object, which object is referred to herein as a "server". Thus, clients invoke operations, or implementations, from servers. In a distributed object environment, clients need not have knowledge of the implementation programming language, nor does the implementation have to have knowledge of the client's programming language due to the requirement of multilingual character of such objects. Clients and servers in distributed object environments need only communicate in terms of the interface definition language. As noted above, the request by the client to the server, and the server's reply to the client, is handled by the ORB.

An "object interface," is a specification of the operations, attributes, and exceptions that an object provides. Preferably, object interfaces for distributed objects are written using, e.g., IDL. As noted above, objects perform services through their interfaces. The use of interfaces therefore relieves the need of clients to be aware of the programming languages used to define the methods and data of the objects in the service.

II. PHYSICAL EMBODIMENT

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should remembered, however, that all of these and similar terms are to be associated with the appropriate physical quantities and are merely convenient labels applied to these quantities.

Further, the manipulations performed are often referred to in terms, such as identifying, running, or comparing. In any of the operations described herein that form part of the present invention, these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

In an embodiment of the present invention, distributed objects are located on one or more computers linked together by a computer network such as the network illustrated at 100 in FIG. 1. As seen in the Figure, network 100 includes computer 102 which computer is coupled to a network 104. Network 104 can further include a server, router or the like 106 in addition to other computers 108, 110, and 112 such that data and instructions can be passed among the networked computers. The design, construction and implementation of computer networks will be familiar to those of skill in the art.

Figure 2:
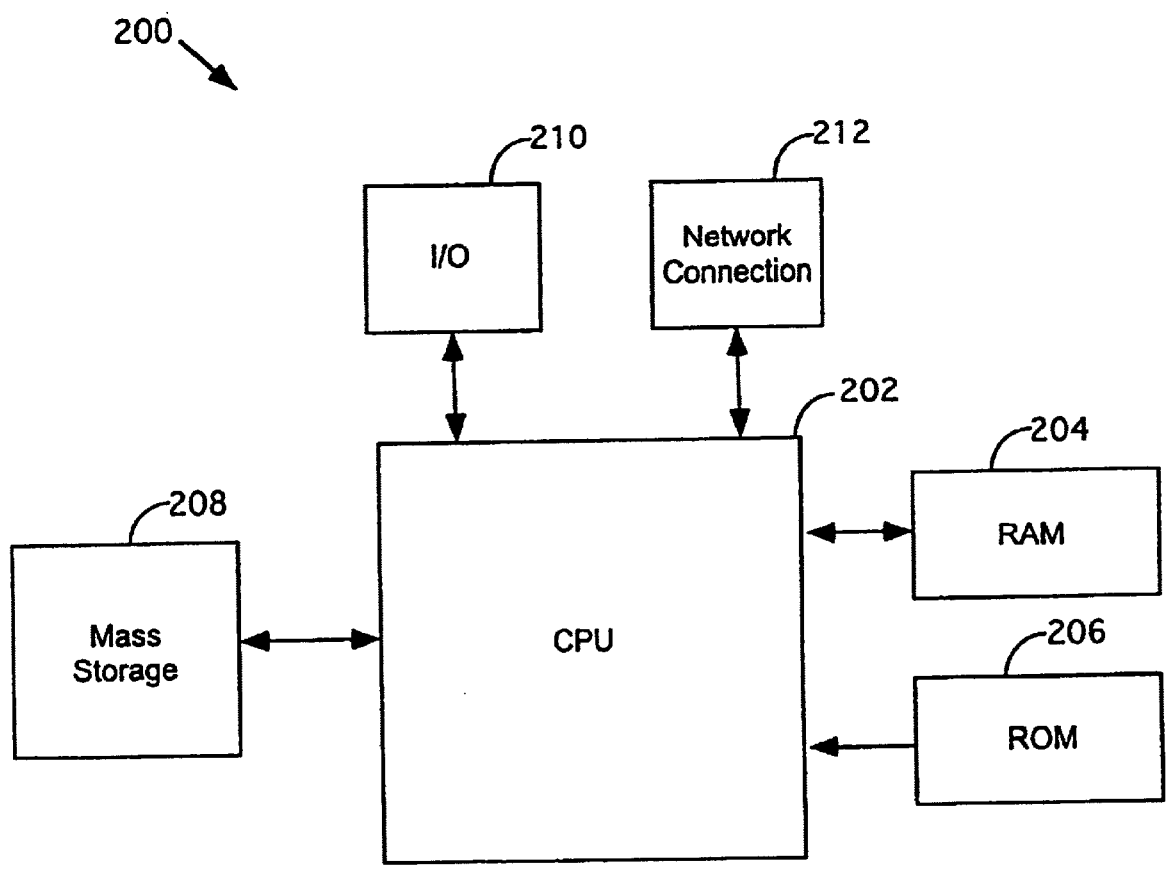
FIG. 2 is a schematic illustration of a computer shown in FIG. 1.

Computers 102, 106, 108, 110, and 112 are illustrated schematically with respect to FIG. 2 at 200. Each computer includes a central processing unit (CPU) 202 which CPU is coupled bidirectionally with random access memory (RAM) 204 and unidirectionally with read only memory (ROM) 206. Typically, RAM 204 includes programming instructions and data, including distributed objects and their associated data and instructions, for processes currently operating on CPU 202. ROM 206 typically includes basic operating instructions, data and objects used by the computer to perform its functions. In addition, a mass storage device 208, such as a hard disk, CD ROM, magneto-optical (floptical) drive, tape drive or the like, is coupled bidirectionally with CPU 202. Mass storage device 208 generally includes additional programming instructions, data and objects that typically are not in active use by the CPU, although the address space may be accessed by the CPU, e.g., for virtual memory or the like. Each of the above described computers further includes an input/output source 210 that typically includes input media such as a keyboard, pointer devices (e.g., a mouse or stylus) and the like. Each computer can also include a network connection 212. Additional mass storage devices (not shown) may also be connected to CPU 202 through network connection 212. It will be appreciated by those skilled in the art that the above described hardware and software elements, as well as networking devices, are of standard design and construction.

Residing on each of the computers across the network are a variety of processes and objects, which processes and objects can be in communication with each other, either within the memory space of the same machine or within the memory spaces of two or more machines residing on the network. As noted above, an object resides in a server process and functions to respond to a request made by a client. In distributed object systems, the communication of the request between the client and the object is mediated by an object request broker (ORB).

Figure 3:
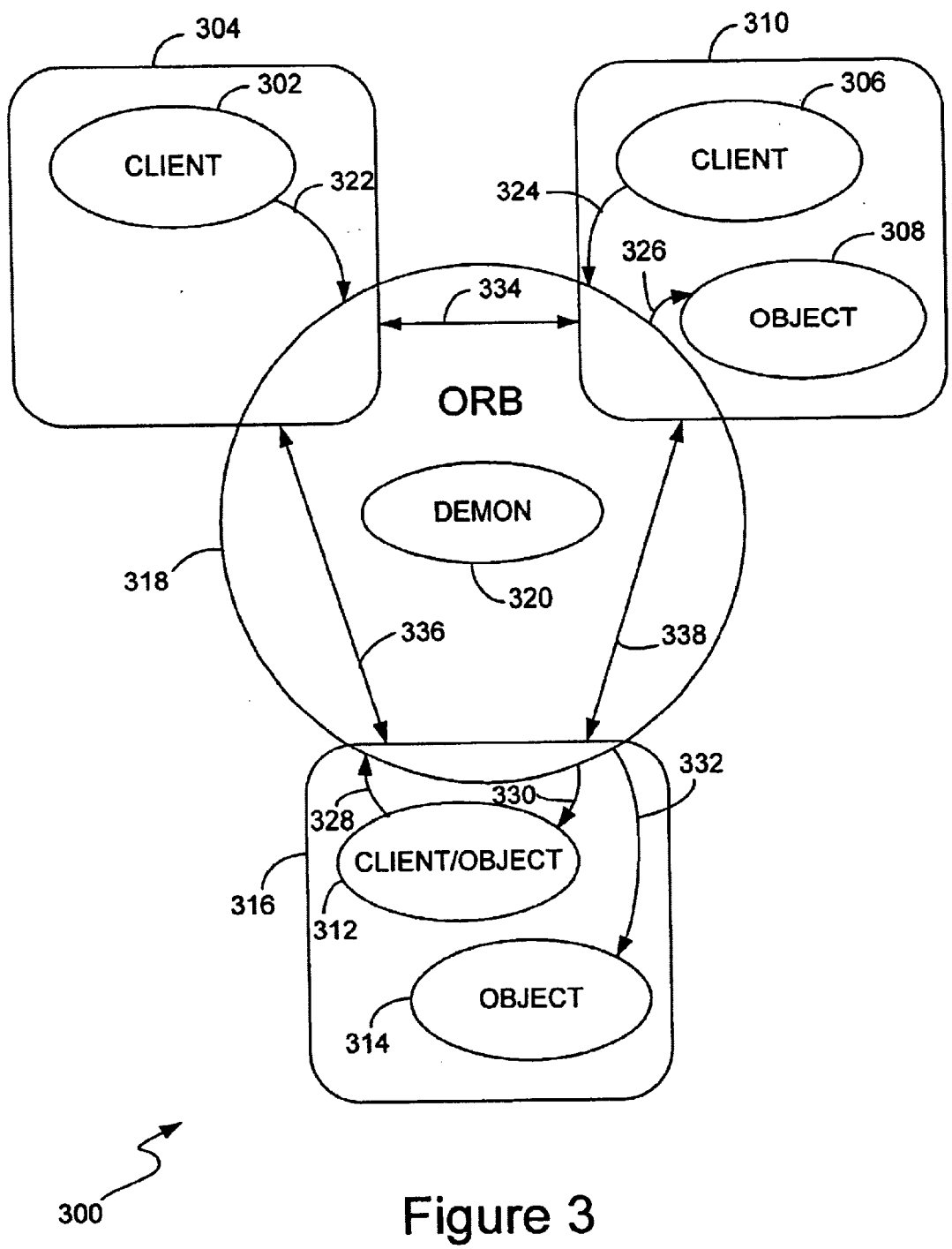
FIG. 3 is an illustration of the relationship between objects in a distributed object system and an object request broker.

An example of such client/server relationships in a distributed object system is illustrated in FIG. 3 at 300, where a first client 302 resides in a process 304, a second client 306 and an object 308 reside in a second process 310 and a client/object 312 and second object 314 reside in a third process 316. It will be appreciated that connections can be established between clients and objects in different processes, e.g., between process 304 and process 310, or between clients and objects in the same process (e.g., client 306 and object 308). Each process may reside on separate computer(s) connected across a network, or two or more process may be located on the same machine. In addition, the client(s) and object(s) may be executed within processes on one or more threads. The use of objects, processes and threads will be familiar to those of skill in the art.

Regardless of the physical location of the processes, each process communicates to another process through an object request broker mechanism (ORB) 318. ORB 318 typically includes at least one daemon for processing connection requests from clients and servers such as Daemon 320. Thus in terms of the definitions provided above, clients, such as clients 302 and 306, request, or "invoke", replies from objects, such as objects 308 and 314, by first establishing connections 322 and 324 with the ORB respectively. The requests are processed by the ORB and the Daemon which communicate with target objects 308 and 314 over connections 326 and 332 respectively. The ORB then establishes connections between the processes containing the appropriate clients and servers, such as connections 334 (connecting processes 304 and 310), 336 (connecting processes 304 and 316) and 338 (connecting processes 310 and 316). In a preferred embodiment, objects can act both as clients and servers, such as client/object 312 which communicates with ORB 318 over connections 328 and 330. The details of establishing connections among objects in a distributed object system are discussed in the above-cited co-pending U.S. patent application Ser. Nos. 08/408,317; 08/408,316; 08/408,645; and 08/408,954.

Figure 4:
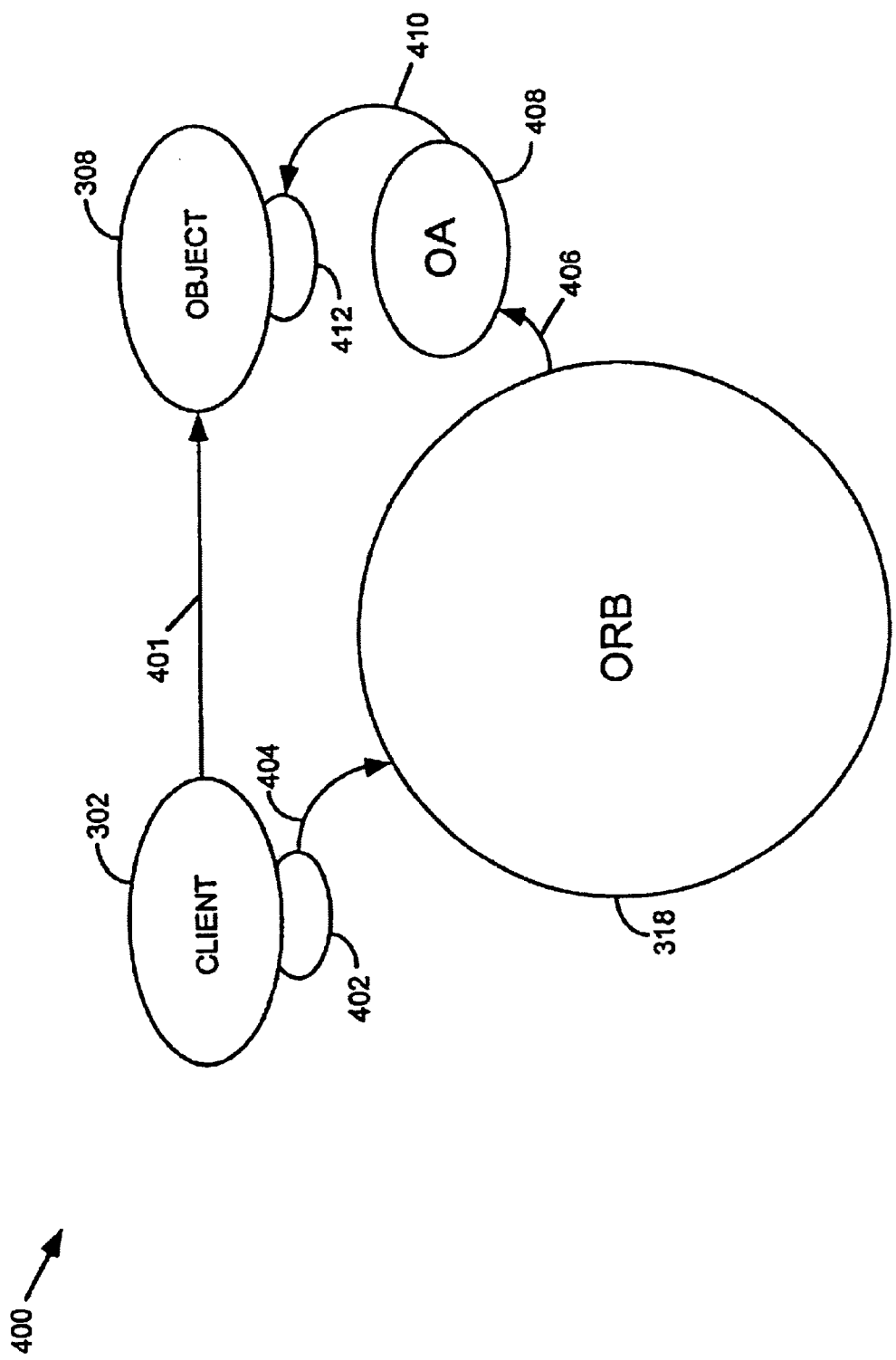
FIG. 4 is a detailed illustration of the communication between a client and an object as illustrated in FIG. 3.

The sequence of events which comprise communication between a client and an object is illustrated in greater detail with respect to FIG. 4 at 400. There, client 302 seeks to communicate with object 308. Formally, from the standpoint of the client, an invocation of object 308 requires the use of an object reference within the client that points to object 308 as illustrated by arrow 401. However, to accommodate the need for maintaining a high degree of generality in the system, the actual flow of information comprising the invocation is somewhat more complicated. In reality, the invocation of object 308 requires the request to travel from client 302 to a stub 402 associated with the client, which stub provides an interface between client 302 and ORB 318. The stub determines the necessary formatting to send the message to the remote object. The communication between the stub and ORB is illustrated by arrow 404. Using the methods described above, ORB 318 communicates with object adapter 408 as shown at 406 which object adapter is effective to locate and/or launch object 308. When object 308 is loaded into memory and is running, the object adapter passes the invocation as shown at 410 to a skeleton 412 for object 308. The skeleton receives the request from the object adapter and calls the appropriate operation, or method, in the object and forwards to the client any return values.

Thus, it will be appreciated that distributed objects require an extensive amount of programming effort beyond that required to create a non-distributed object to operate properly. On the client side, not only must object references be made available, but stubs must be made available for communication with the ORB. On the server side skeletons must be provided to interface with the object adapter which object adapter interfaces with the ORB. It will also be appreciated that this example pertains only to the communication between a client and an object. Those of skill will realize that still more modifications are required in order to support other system functions, such as the launching and deletion of objects and the operation of various housekeeping functions required by the distributed object system.

Generally, the support functions or services required for developer-written objects or classes of objects to function in a given operating system environment are provided using libraries of support objects that can be accessed by the developer-written object or class. The libraries thus provide a centralized source for code that a developer can access when writing programming code for a developer-written object or class. In object programing, such access is often provided by establishing inheritance relationships between the developer-written object or class and classes containing support functions and/or services in the libraries. The creation and use of inheritance relationships is well known to those of skill in the art of object programing.

Figure 5:
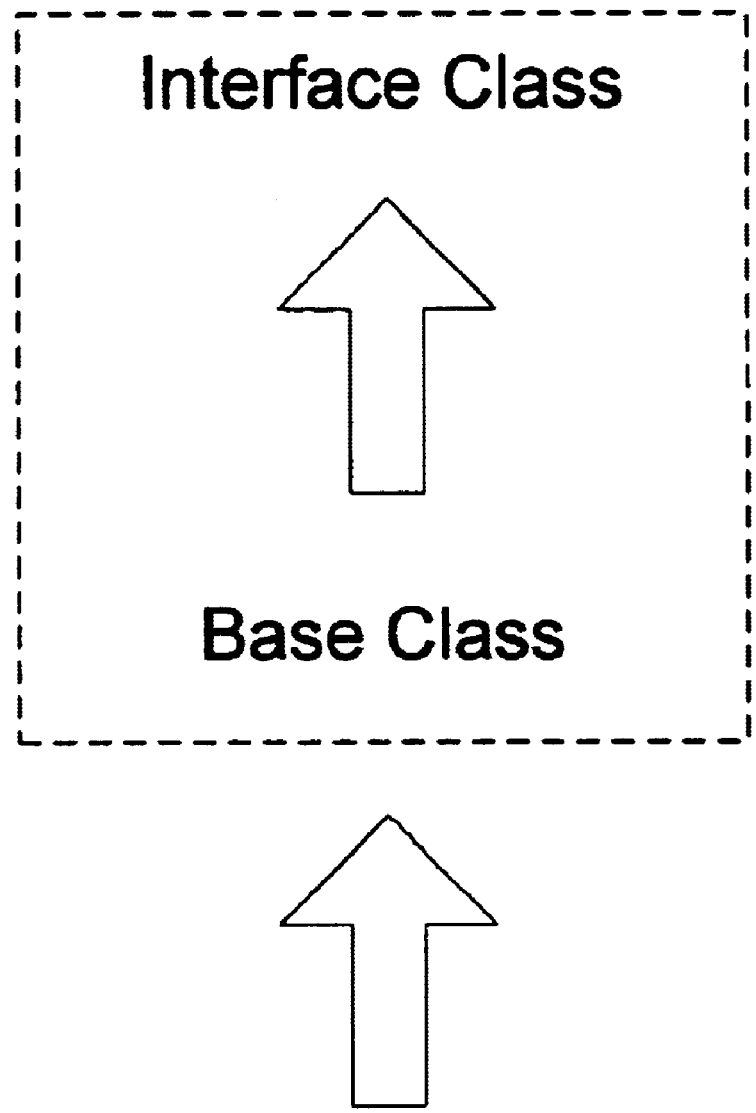
FIG. 5 illustrates an inheritance hierarchy in accordance with prior art teachings.

The present invention provides the support functions and services necessary for the operation of objects in a distributed object system in a transparent manner by employing a mechanism of inheritance different from that practiced in the prior art. Under prior art methods, as illustrated in FIG. 5, a developer-written object or class inherits from a base class of system support functions and services that provides the developer with access to the various system functions required for implementation of the servant object. The base class in turn inherits from an interface class that supplies the required interface attributes for the system utilities. It will be appreciated that the interface class may optionally be included within the base class as indicated by the dashed box. Generally the interface class is a "pure" class, i.e., the class provides only interfaces, not methods.

Those of skill in the art will appreciate that such a structure forces the responsibility and burden of incorporating all of the desired system functions and interfaces that are required to make the object work onto the developer. Generally, the developer is required to implement the necessary functions and services by writing the appropriate calls and invocations to the functions and services into the developer-written object or class and linking that object or class to libraries belonging to the base class and/or interface classes at the time of compilation. As will be appreciated by those of skill in the art, in a distributed operating environment such as described above with respect to FIGS. 3 and 4 this requirement places a tremendous burden on the developer to incorporate and define the necessary structures needed to support the existence of the object on the distributed object system.

The present invention avoids this difficulty by incorporating an "inverted" inheritance structure in which the distributed object is a member of a wrapper class of object development functions and services that inherits from the developer-written, or servant, class, i.e., the class of interest to the programmer and user, to provide a distributed object capable of functioning on a distributed object system. As will be seen below, such an inheritance structure allows for the generation of distributed object classes that incorporate all of the necessary and optional programming code required to operate a distributed object on a distributed object system in addition to the functions provided by the developer-written object or class. Thus, it will be seen that the present invention removes the burdens on the developer described above by providing substantially transparently the programming code required for distributed objects to operate in distributed object systems.

Figure 6A:
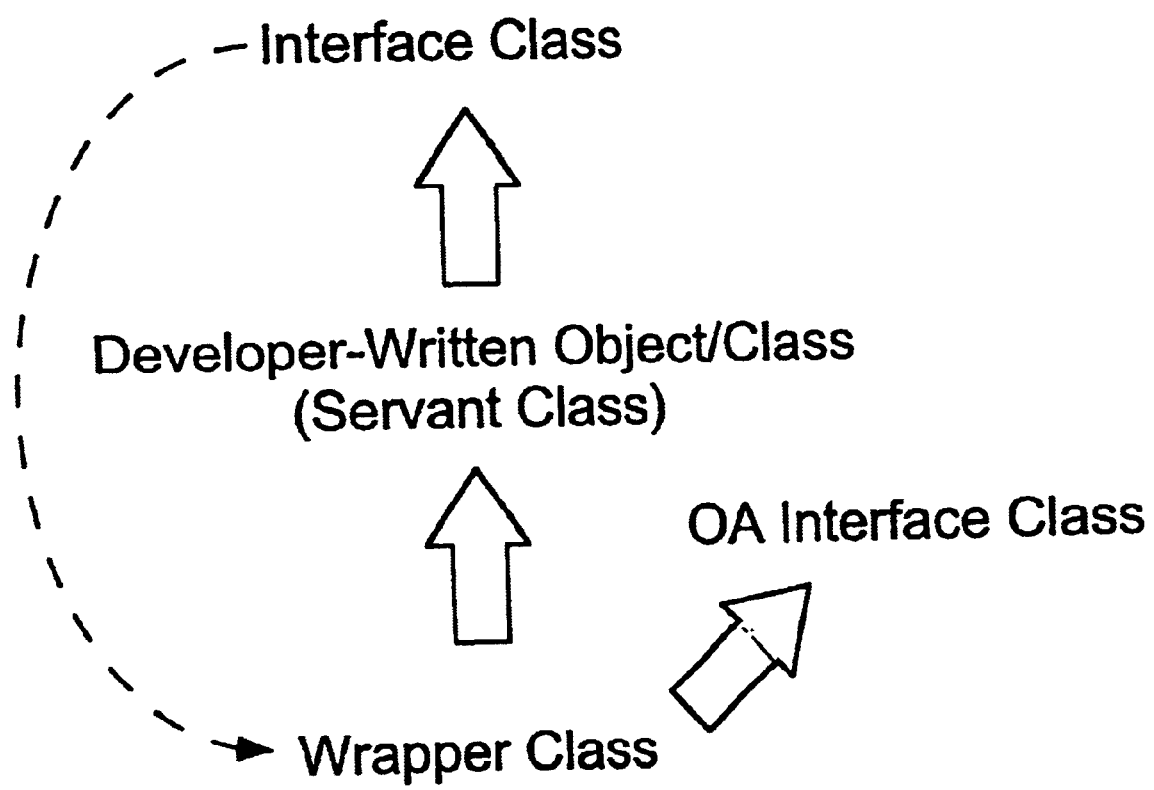
FIGS. 6A and 6B represents inheritance hierarchies in accordance with the present invention.
Figure 6B:
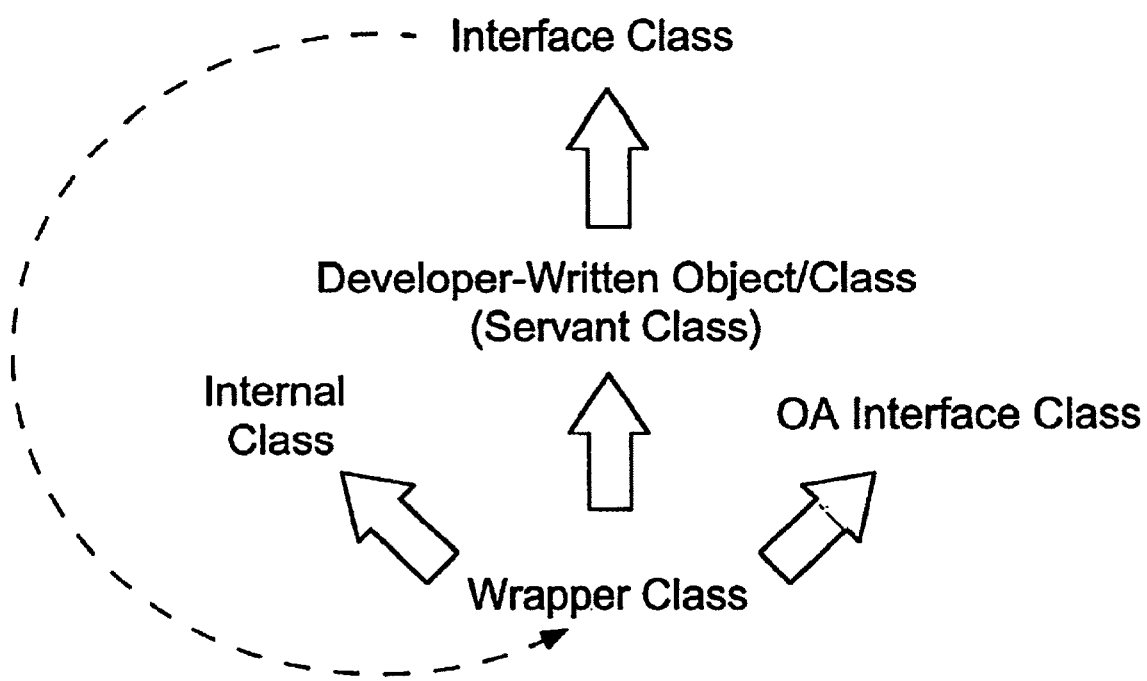

In one embodiment, shown in FIG. 6A, the wrapper class inherits from the developer-written object/class (servant class) which in turn inherits from the above-described interface class. As noted above; the interface class provides the interfaces for the functions and services of the wrapper class, as indicated by the dashed line in the Figure. In addition, to allow the skeleton to call code in the wrapper class, the wrapper class further inherits from an object adapter (OA) Interface Class. In one embodiment, one OA Interface Class is provided for each interface registered with the ORB. The wrapper class may optionally further inherit from one or more additional classes depending on the organization of the system support functions. In one embodiment, shown in FIG. 6B, the wrapper class inherits from the developer-written class (and, in turn, from the inheritance class) in addition to an OA interface class and an internal class that contains additional functions and services. In one embodiment, these additional functions and services are not available to the programmer, but are private to the system.

Figures 7A, 7B, 8:
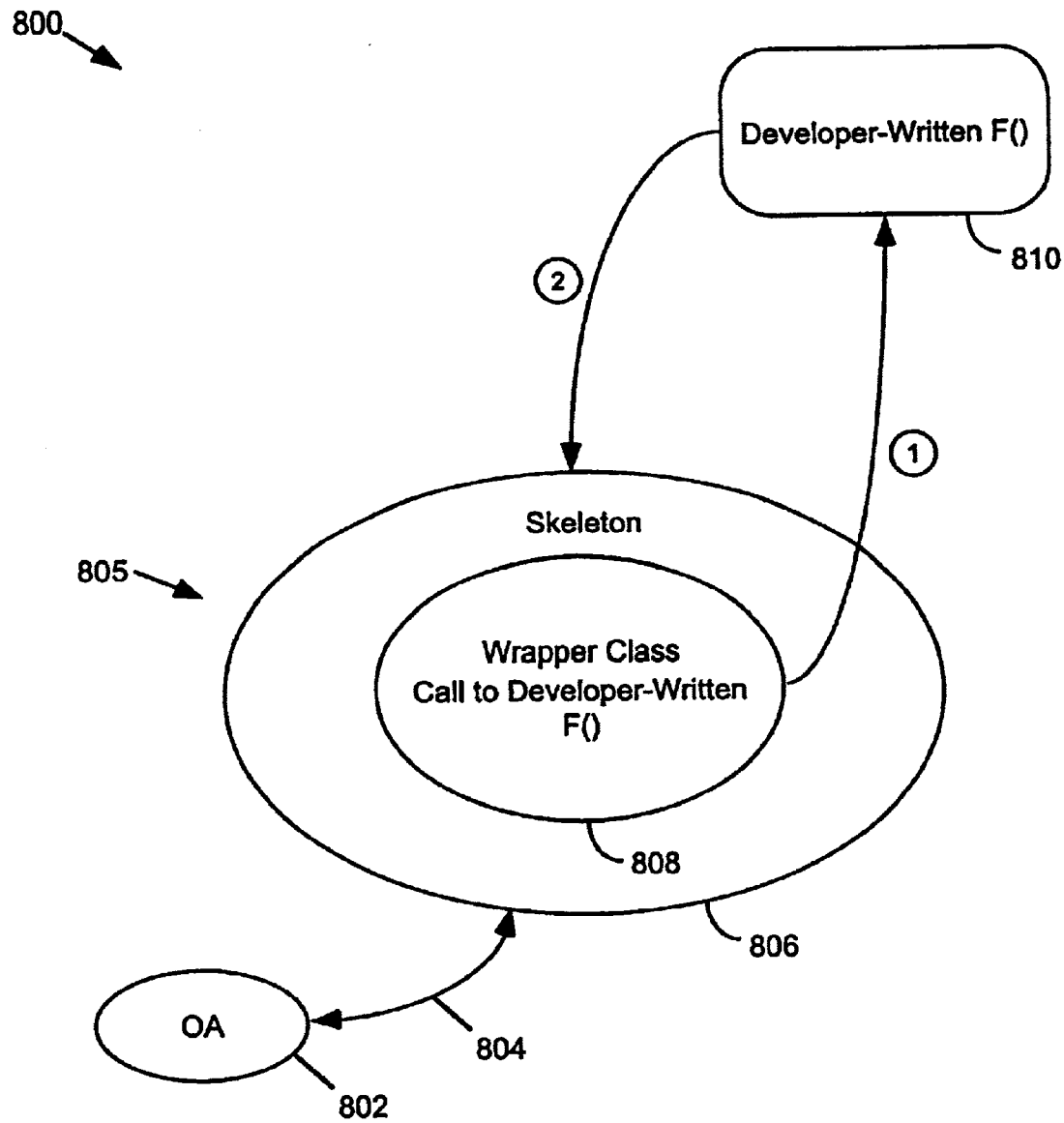
FIGS. 7A and 7B illustrate developer-written and method functions.
FIG. 8 is an illustration of the flow of information in the distributed object function of the invention.

The inversion of inheritance structure is accomplished in part by a procedure referred to herein as "wrapping", in which statements implementing wrapper class services are placed around a call to the developer written function. This code structure is illustrated with reference to FIGS. 7A and 7B. In FIG. 7A, a developer-written function F( ) is shown. As will be familiar to those of skill in the art, especially those skilled in the art of programming in the C or C++ languages, the developer-written function comprises a statement of the function name and any arguments taken by the function plus the statements that comprise the workings of the function, shown as ellipses within the braces.

FIG. 7B illustrates a method function, Dist_Obj_F( ), implemented in accordance with the present invention in which a call to a developer-written function has been bracketed or "wrapped" by wrapper statements or code that implement the support services of the wrapper class (Wrapper_Stmt_A, Wrapper_Stmt_B, Wrapper_$Stmt$_C and Wrapper_Stmt_D) above and below a call to the developer-written function F( ). These statements may be function calls or inline functions written in programming code (e.g., in C++). It will be appreciated that the wrapper statements may include paired statements that bracket the call to the developer-written function, e.g., a first statement to initiate a service prior to the operation of the developer-written function and a second statement following the execution of the developer-written function to exit the service, in addition to individual statements that are written either before or after the call to the developer-written function. In one embodiment, the distributed object created using such a structure is a member of the wrapper class which provides the distributed object support for the functions required for operation in a distributed object system in addition to any optional system features the programmer wishes to implement.

In a one embodiment, the services provided by the wrapper class include object lifecycle services, object request broker and object adapter services, registration services, multithreading services, subobject services, refdata services, reaper services, object reference services and tracing and logging services. It will be appreciated by those of skill in the art, however, that this list of services is by no means exhaustive nor is the inclusion of each family of functions and/or services listed necessarily required for the installation and/or operation of a distributed object in a distributed object system. Families of services may be added or removed from the wrapper class without departing from the scope of the present invention. In general, the number, type and organization of the services comprising the wrapper class will depend on the nature of the operating system, the object request broker mechanism and the object adapter mechanism. It will be further appreciated that these services may be implemented in a variety of ways using methods known to those of skill in the art. In one embodiment some of these services are implemented in accordance with CORBA specifications.

In one particular embodiment, the above-mentioned lifecycle services include object creation functions, object deletion functions, object activation functions, object deactivation functions, server startup functions, server shutdown functions and server installation functions. These functions allow for the creation, installation, operation and deletion of objects and servers in the distributed object system. An implementation of some of these functions is described in co-pending U.S. patent application Ser. No. 08/414,923, entitled "Method and Apparatus for Managing Objects and Processes in a Distributed Object Operating Environment" by Alan Snyder, filed concurrently herewith and incorporated herein by reference.

The creation functions are used to create distributed objects that are recognized by the ORB in addition to object references to the created objects. In one embodiment, these functions are available only within object servers containing the object implementation and are used primarily within the methods contained in factory objects (see, e.g., co-pending U.S. patent application Ser. No. 08/408,634 entitled "Method and Apparatus for Managing Relationships Among Objects in a Distributed Object Environment", by Bruce E. Martin, et al., filed Mar. 22, 1995, and incorporated herein by reference).

Deletion functions provide a means for deleting an object from the distributed object system. In one embodiment, the deletion function does not immediately remove the object from the distributed object system, but rather sets a flag that enables the object to be deleted upon the deactivation of the object. This allows the object to behave correctly in the face of concurrent requests. Preferably, the check for the flag set by the deletion function can be made by the system or can be performed manually, i.e., by code written by the programmer. In another embodiment, a deletion hook may be defined that allows the invocation of a programmer-written function by the system upon the deletion of an object.

Activation functions allow for the activation of objects so that the objects are available on the distributed object system. In one embodiment, the system performs the activation of objects that receive invocations or upon the installation of new objects on the distributed object system. In a preferred embodiment, a C++ servant (i.e., a C++ implementation of the interface of the object) is created upon activation of the object. In another preferred embodiment, an activation hook is defined such that the system will invoke a programmer-written function just prior to activation of the object. The activation hook may be used to accomplish a variety of actions, e.g., to initialize the transient state of the servant, establish conspiracies (see U.S. patent application Ser. No. 08/414,778, entitled "Method and Apparatus for Conspiracy Among Objects" by Aahlad Yeturu, filed Mar. 31, 1995 and incorporated herein by reference) and provide access to persistent data (see U.S. patent application Ser. No. 08/414,770, entitled "Method and Apparatus for Providing Transparent Persistence in a Distributed Object Operating System" by Mark W. Hapner, filed Mar. 31, 1995 which is incorporated herein by reference.

Conversely, deactivation functions render objects unresponsive to invocations made on the objects following deactivation. However, deactivated objects may still process invocations made prior to deactivation. Generally, deactivation frees system resources used by the object, e.g., such as the C++ servant associated with the object as described above. In one embodiment, deactivation is handled by the system automatically after the object has been determined to have been idle for a set period of time (e.g., 15 minutes or 1 hour). Of course, those of skill will recognize that automatic deactivation may be disabled and instead performed using programmer supplied conditions and functions. In another embodiment a deactivation hook is provided to allow the execution of a programmer-written function at the time of deactivation.

Server startup functions are used to perform tasks at the time of the server's launching on the distributed object system, although preferably not in conjunction with startups performed solely to install or remove the object from the distributed object system. In one embodiment, the server startup functions are hooks that are invoked during server startup, preferably, but not necessarily, before any requests are processed by the server.

Server shutdown functions cease server execution. As with deactivation functions, shutdown functions are preferably activated automatically following a specific period of time (e.g., one hour). In a preferred embodiment, the automatic execution of the server shutdown function can be disabled or modified by the programmer. Server shutdown hooks may also be used to invoke programmer-written functions at the time of server shutdown.

Server installation hooks are also provided in one embodiment. These allow the invocation of a programmer-written function during server installation. In another embodiment, the function returns a Boolean (true or false) value. If the value is "true", server installation proceeds; if "false" installation is aborted. It will be appreciated that such a hook will be useful in checking for the presence of system resources that are vital to server operation at runtime. If the resources are not present, installation of the server can be aborted, preferably returning an exception.

In one embodiment, registration functions are included for registering an object on the object request broker mechanism, unregistering an object on the object request broker mechanism and a finding a service provided by an object registered with the object request broker. The use of such functions will be known to those of skill in the art. The registration function registers an object in an area of computer memory assigned for object registration. The unregister function removes the registration of objects from those areas of computer memory assigned for object registration, and returns the object references. The find function searches pre-allocated areas of memory allotted to objects that provide the desired service. Preferably, some of these functions are implemented in accordance with CORBA guidelines.

It will be appreciated that still more functions can be defined to handle interaction between the distributed object and the distributed object system and/or object adapter. For example, functions can be included to allow objects to define and access reference data. Other functions can be used to create and identify subobjects as described in co-pending U.S. patent application Ser. No. 08/408,317 and object references. Still other functions may be used to implement tracing and logging of code execution. Yet other functions can be used to support multithreading. The choice and implementation of such functions will depend on the particular details of the distributed object system, as will be apparent to those having skill in the art.

By way of example, in one embodiment the wrapper class comprises several types of member functions including method functions, service functions, creation functions and support functions. Each of these functions is included in one of the above-described services, but will be described in additional detail below. Again, it will be appreciated that implementation of the functions can be accomplished in a variety of ways, as will be apparent to one of skill in the art, and that one or more of these function may be omitted, or the functions augmented by additional functions, without departing from the invention.

Method functions are invoked by the skeleton when an object receives a request from a client. These functions include "housekeeping" actions such as acquiring mutex locks on a data structure, logging the object's activity, testing for deletion of the object prior to receipt of the invocation, acquiring persistent data and the like. These functions contain wrapper code that "wraps" calls to functions in the servant class that are similar to the method function. An example of the structure of a method function is shown below.

```
method_function (arguments) {
    wrapper code;
    result = servant : : function(arguments);
    wrapper code;
    return result;
}
```

The statement "result=servant::function(arguments)" will be recognized by those of skill in the art as a statement that sets the value of the variable "result" of wrapped function "method_function" equal to the developer-written function "servant::function(arguments)". It will be seen that the function method_function is capable of supporting operation in a distributed object system and implementing the desired developer-written function by virtue of including the wrapper code in addition to the call to the developer-written function.

In one embodiment, a method function in accordance with the present invention appears as follows:

Log Entry
Acquire Lock
Begin Transaction
Log Acquiring Lock
Test for Deletion
Fetch Subobject ID
Call F( )
Delete Subobject ID
End Transaction
Release Lock
Log Exit/Exception Log Entry and Log Exit/Exception are wrapper code implementing the logging of the execution of the method function. The wrapper code Acquire Lock and Release Lock implement mutex locks on data stored in memory for the purposes of multithreaded programming operations. Begin Transaction and End Transaction are wrapper code defining the endpoints of the operation of the object on the data in memory. Fetch and delete subobject ID are wrapper code that implements subobject operations as discussed in co-pending U.S. patent application Ser. No. 08/408,317. As mentioned above, these statements are paired around the developer-written function as they require a starting action before the function call followed by a terminating action after the function call. Test for deletion is wrapper code that determines whether the object is in the deleted state, at which point an exception is returned to the client. This statement appears only once, before the call to the developer-written function. Call F( ) is, of course, a call to the developer-written function. The implementation of the wrapper code will be apparent to those of skill in the art. It will also be appreciated that one or more of the above-described wrapper code features can be omitted at the option of the developer.

Service functions provide services that the servant class can use. In one embodiment, these functions are called from the servant class by use of the above-described interface class. In addition, these functions are not wrapped as the wrapper code described above, but may be called by the developer within the developer's own code. These functions can include, e.g., functions to acquire and release locks on data structures, functions to activate and delete objects, functions to check for deletion, functions to define object lifespan, and functions to make and abort changes to persistent data.

In one embodiment, the service functions include a Delete function to delete an object, a Deleted function to check the deletion flag for an object to determine if that object is in a deleted state, and a Check_For_Deleted function to raise an exception to the client if the object is in a deleted state. In addition, a Refdata function to obtain the reference data for an object, a Facility function to return a class-specific tracing facility for logging information specific to the object implementation class, a Commit function to determining the end of atomic unit of change for writing persistent data to storage, and an Abort function to abort changes to the last actual commit may be provided. Further, a Lock function to explicitly reacquire a mutex after the lock has been released, a Read_Lock function to reacquire a lock for a read operation after the lock has been released, a Write_Lock function to reacquire a lock for a write operation after the lock has been released and an Unlock function to release a lock may be included.

Additional service functions can include a Deactivate function to allow an object to deactivate itself and destroy the associated servant, a Create_Subobject function to create subobjects, a Timeout function to set a minimum idle time for an object before that object is deactivated, and a Servant_Objref function to obtain the ORB object reference for an object. The implementation of these functions will depend on the nature of the distributed object system and will be familiar with those having skill in the art. It will also be recognized that the foregoing list of functions is but one embodiment of the invention and that functions listed above can be removed or replaced without departing from the invention.

Creation functions are static member functions that are public. These can be called from other code in the server, such as a registration hook (described above) or a factory object method. Creation functions are not called through the interface class, but rather are called directly by name. In one embodiment, the Creation functions include a Creator function to create an instance of a servant class and its persistent data which the creator function stores in the refdata of the object. The creator function also signals the OA to create the object and calls any initialization hooks that have been defined by the programmer (see above), Support functions are called either by the object adapter (e.g., to activate an object) or from or elsewhere in the wrapper library. In one embodiment, these functions are not available to the developer, but are private and undocumented. The support functions include a Constructor function to initialize a mutex lock, find the persistent data for the object and attach the persistent data to the servant. A Destructor function is also included to test for object deletion and, if the object is deleted, delete the persistent data associated with that object.

Start-Up and Shut-Down support functions may also be included. The Start-Up function serves to open persistent data storage, register the class with the ORB and invoke any start-up or register hooks. The Shut-Down function closes persistent data storage and calls any shut-down hooks. A Configure function defines a tracing facility to allow tracing events to be posted and calls any configuration hooks. An Activation function is available to create the servant, call the user's activation hook and notify the object adapter (OA) that the object is active. A Deactivation function quiesces the object, calls the above-described deactivation function, unquiesces the object and checks for the deletion flag. If the flag is set, the ORB is notified to dispose of the object and any deactivation or delete hooks are called. The servant is then deleted. A Deactivation Upcall function may also be included to allow the OA to call the deactivation function.

The operation of a distributed object produced by the above-described wrapping is illustrated at 800 in FIG. 8. As described above, an object adapter 802 (OA) sends a request (arrow 804) to the distributed object 805. The distributed object 805 is seen to comprise two layers, the skeleton 806 that comprises those functions and services that handle interactions with the object adapter, and a second layer 808 that comprises the wrapper class, the call to the developer-written function and those functions that handle the interaction of the distributed object with the ORB. An invocation to the distributed object is handled initially by the first layer which processes messages sent to and received from the object adapter. When the parameters sent to the skeleton of the distributed object are passed to the second layer (not shown), the developer-written function 810 is called (pathway 1). The function is executed by the developer-written function and any result is returned to the client via skeleton 806 (pathway 2).

A distributed object including the above-described inheritance structure can be created using methods known to those of skill in the art for creating objects and linking code from libraries into objects and methods for establishing inheritance relationships among classes. These methods can include those wherein the developer provides the code required to establish the inheritance relationships. Preferably, however, at least some of the code that comprises the distributed object, including the aforementioned inheritance structure, is generated for the developer, e.g., by a processor, pre-processor, compiler or the like, so that the programmer is relieved at least somewhat from the burden of providing code to support the operation of the distributed object on the distributed object system.

In one embodiment, the present invention includes a method and apparatus for generating a distributed object in which the developer provides one or more input files in addition to programming code that defines a developer-written, or servant, object and/or class. From these input files one or more templates are generated containing a prototypical version of the servant class in which the functions are empty or contain comments or instructions for the developer. The developer provides the appropriate information to produce code that, when compiled and linked with the wrapper class, produces a distributed object capable of running on a distributed object system.

Figure 9:
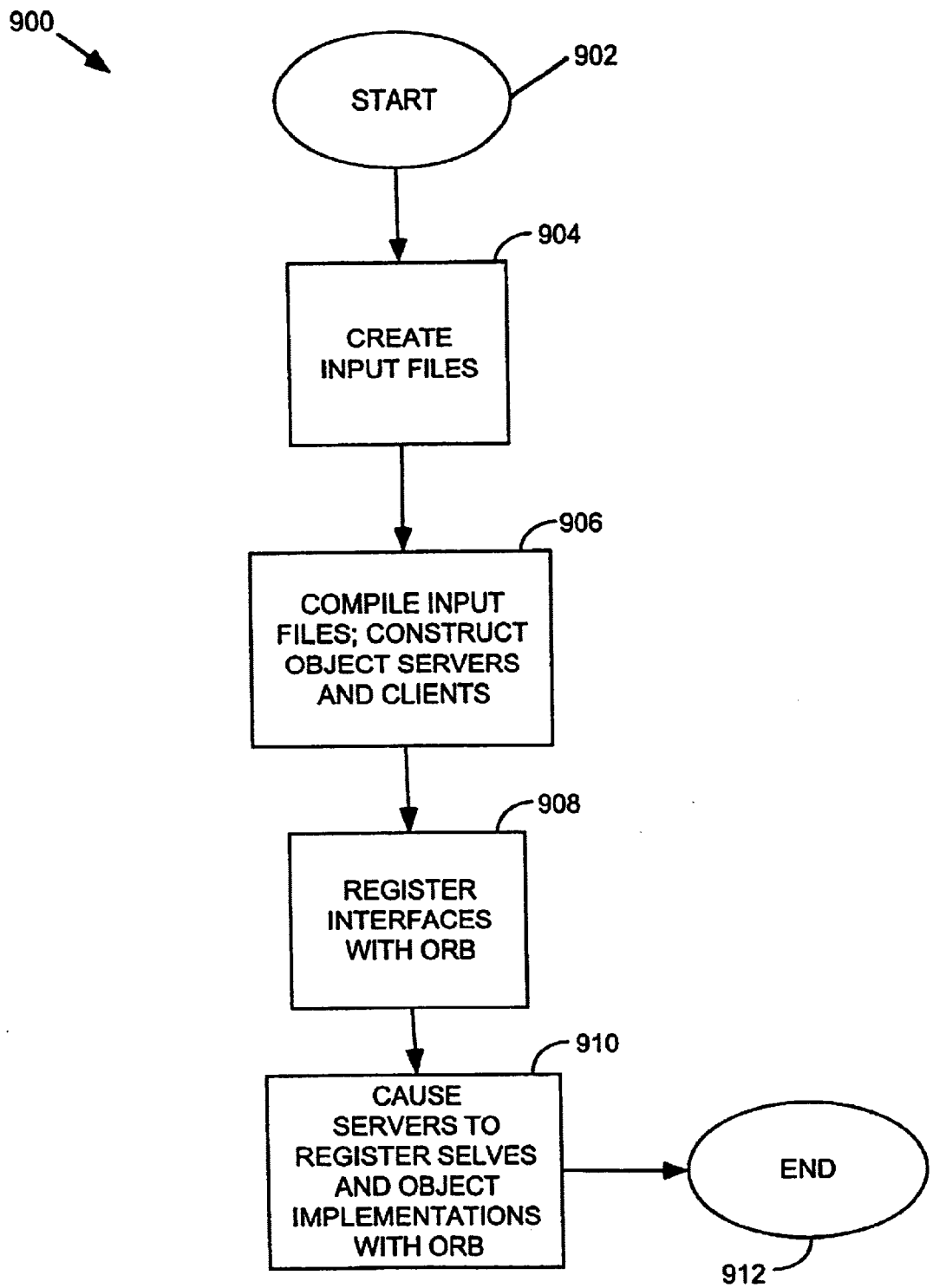
FIG. 9 is a flowchart illustrating the construction of a development distributed object of the invention.

One method of forming the distributed objects of the invention for development purposes is illustrated with respect to FIG. 9 at 900. Starting at step 902, various input files are created by the developer at step 904. Preferably, these files are text (ASCII) files that include the information necessary for a compiler to process the developers code, wrap the code in the appropriate functions required for operation of the object on the distributed object system and link the compiled code to the appropriate interface class, OA interface class, servant class and, optionally, internal class libraries. It will be appreciated by those of skill in the art that such files can be created using any text processor. It will be further appreciated that the actual content of these files will vary depending on the particular compilers being used, which compilers will vary in turn with the particular operating system employed. In one embodiment, the operating system is the Solaris® operating system available from Sun Microsystems of Mountain View, Calif. In one embodiment, the input files comprise a file or files containing the parameters and instructions for the object's interface; a file or files containing the parameters and instructions for the implementation of the object; a file or files that contain the parameters and instructions defining the servant classes for the object's implementations; and a file or files that include compiled object code and shared libraries that contain code called by the object servers and/or client programs. In addition, shell scripts, package definition files and various make files can be used to generate the distributed object of the invention. Further, a file or files containing persistent data schema can be included as can an exception message catalog. The creation of such files will be well known to those of skill in the art.

The interface definition file(s) can be written using the Interface Definition Language, or IDL, and any persistent data schema files can be written using Data Definition Language, or DDL. These languages will be familiar to those of skill in the art. In a preferred embodiment, the data members defined in the DDL file are stored using the persistent storage mechanism described in co-pending U.S. patent application Ser. No. 08/414,770. The file or files describing the parameters and instructions for the object's implementations will preferably contain inter alia instructions describing how the objects are to be created, activated and deactivated, as well as timeout parameters for servers.

Package definition files are used to create the package of libraries, implementations and interfaces that define the object for installation as deployed objects (i.e., objects for general use on the distributed object system as opposed to development objects that are generally intended for the use of the developer). It will be appreciated that the exact nature of the package definition files will depend on the nature of the operating system controlling the ORB. In one embodiment, the operating system is the Solaris® operating system and the package files include a package definition file defining the name and attributes of the package, a prototype file defining a set of installable files and directories to be included in the package upon installation, a postinstall file comprising a script that is run after installation of the package and a preremove file that contains a script that is executed before a package is deinstalled. In addition, the package definition files may further include a depend file that lists the dependencies of the package on other software packages and a copyright notice file.

The make files include files that define the components to be constructed by the compilers and linkers used to form the distributed object and the locations of those files. These components include interface shared libraries, persistent data object files, object implementations, object servers, client programs, shell scripts and packages. These files can further include definitions of additional components (e.g., source files) and rules for building nonstandard components. In addition, the files can also identify subdirectories containing additional inputs and subdirectories containing package definitions. These files further identify the package into which the installable components are to be composed.

At step 906 the implementation, interface and optional persistent data files are compiled. The compiling of the input files is performed using compilers of standard design and construction and is described in more detail below with respect to FIG. 10. At step 908 the interfaces of the objects are registered with the object request broker as described in greater detail below with respect to FIG. 11. At step 910 the servers and implementations are started to cause self-registration with the object request broker, as described in co-pending U.S. patent application Ser. No. 08/408,645. The sequence terminates at step 912. In one embodiment, the above-described procedures are performed recursively on each subdirectory identified in the make files.

Figure 10:
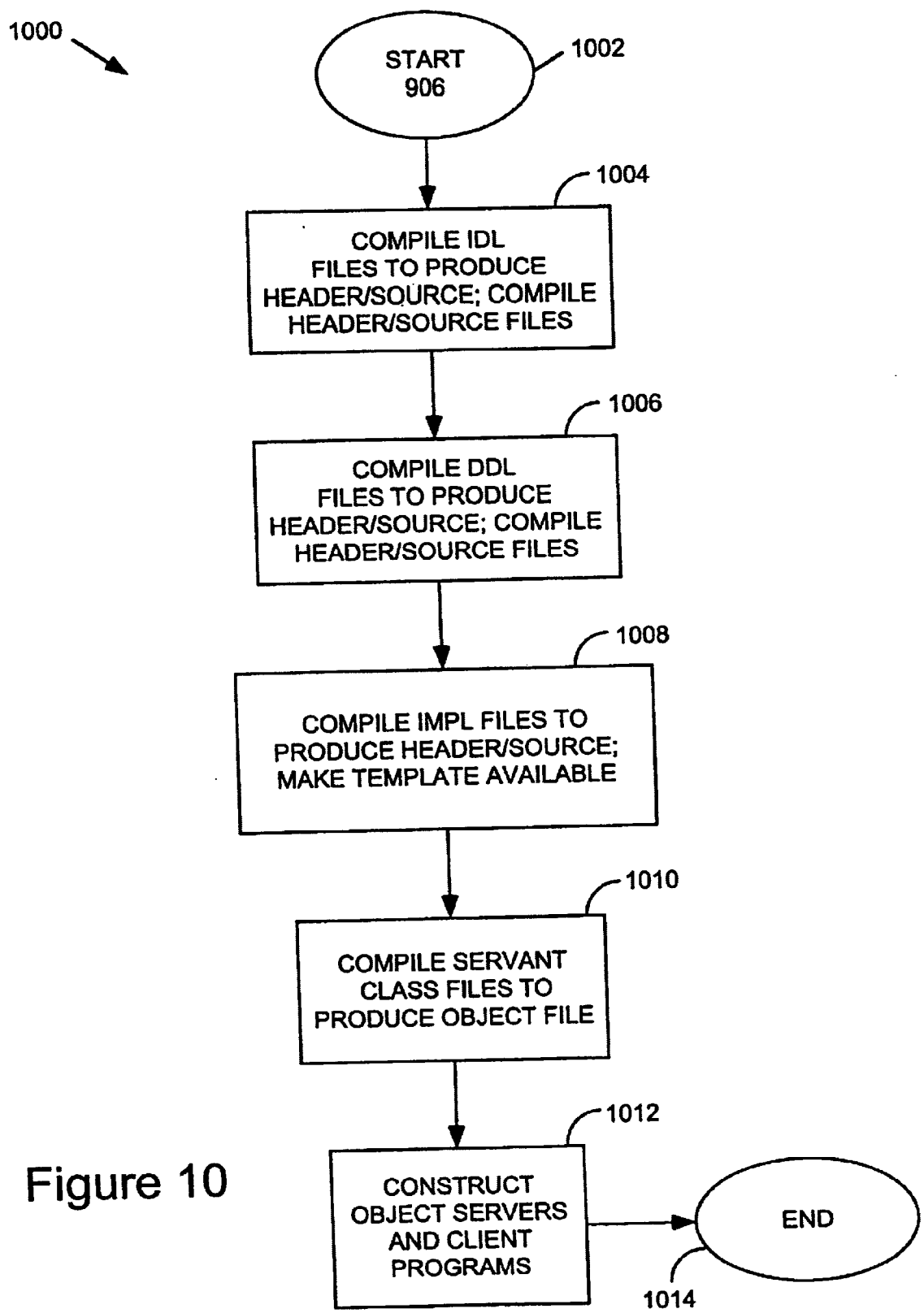
FIG. 10 is a flowchart illustrating in greater detail the compiling step 906 of FIG. 9.

The compiling step 906 is described in greater detail with respect to FIG. 10 at 1000. There, beginning with step 1002, the interface definition library files are compiled to produce header and source files at step 1004. These header and source files are then compiled by using standard compilers that are commercially available.

In one embodiment, the interface definition files are written using IDL and are complied by an IDL compiler to produce C++ header and source files for each IDL file. A preferred IDL compiler is described in co-pending U.S. patent application Ser. Nos. 08/412,546, entitled "Compiler With Generic Front End and Dynamically Loadable Back Ends", and 08/410,357; entitled "Method and System for Type Identification for Multiple Interfaces in a Distributed Object System", both of which are incorporated herein by reference These files are then compiled by a C++ compiler to produce a shared library. In another preferred embodiment, the IDL compiler is capable of renaming the interface of objects that are being developed to avoid conflicts with existing objects that are "deployed" on the system so as to maintain the integrity of objects that are currently in use by clients on the distributed object system. For each interface definition file (e.g., IDL file), the interface compiler is run to produce a special interface repository (IFR) file that includes the information necessary to install the interface in the ORB of a local or remote machine. The production of such an FR file can be accomplished using standard techniques.

Next, at step 1006, any persistent data definition files used to describe persistent data are compiled to produce header and source code which is then compiled into the final object. Again, this is performed using standard commercially available compilers. As described above for the interface definition files, the data definition files are preferably written using DDL and are compiled using a DDL compiler to produce C++ header and source files which are compiled using a C++ compiler to generate an object file.

At step 1008 the implementation files are compiled to produce header and source code. The implementation files are preferably compiled to produce C++ header and source files. In a preferred embodiment, the compilation produces one or more template source files for editing by the developer. These files contain source code that includes the appropriate interface and library references and other code required by the object, in addition to sections that are edited by the programmer to define those portions of the source code not capable of generation by the implementation file compiler, e.g., the developer-written functions. This simplifies the construction of the servant class.

At step 1010 the servant class files are compiled using standard methods to produce the object file and, at step 1012, the object servers and client programs are constructed using standard techniques. The procedure then terminates at step 1014.

Each object server that is defined in the make files is constructed by the linker using the object files and shared libraries generated as described above. In addition, a set of system shared libraries is linked in to provide support for the operating system in addition to the ORB and OA. In a preferred embodiment, a special object file is linked in for development objects, i.e., objects that are under development (not for general use), to avoid conflicts with deployed objects that are in general use on the distributed object system. In one embodiment, this linking operation includes setting a flag to indicate that different file names and identifiers be used for registration to avoid conflicts with any deployed servers. In addition the file paths and search paths for any factories used by the object are altered to avoid conflicts with file and search paths for deployed object factories.

In a preferred embodiment, the construction of the server includes the addition of a spy object that communicates to the system at defined intervals certain information about the server. In addition, the spy object supports operations implemented by the system to change certain system level parameters, including tracing states, operations to request server shutdown, operations to attach a debugger to the server, operations to return parameters to the system, operations to delete the server, operations to return all possible tracing categories and operations to support destruction of the server. These features are described in co-pending U.S. patent application Ser. No. 08/413,402, which is incorporated herein by reference.

Each client program defined in the make files is also constructed by the linker using the object files and shared libraries described above, as well as being linked to a set of system shared libraries. For "development" clients, i.e., clients not intended for general use but for use as aids in object development, a special object file is linked to the client to alter the search paths used by the client so that development factories are found in preference to deployed factories. In one embodiment, the development factories are ignored if they do not support the interface expected by the client.

Figure 11:
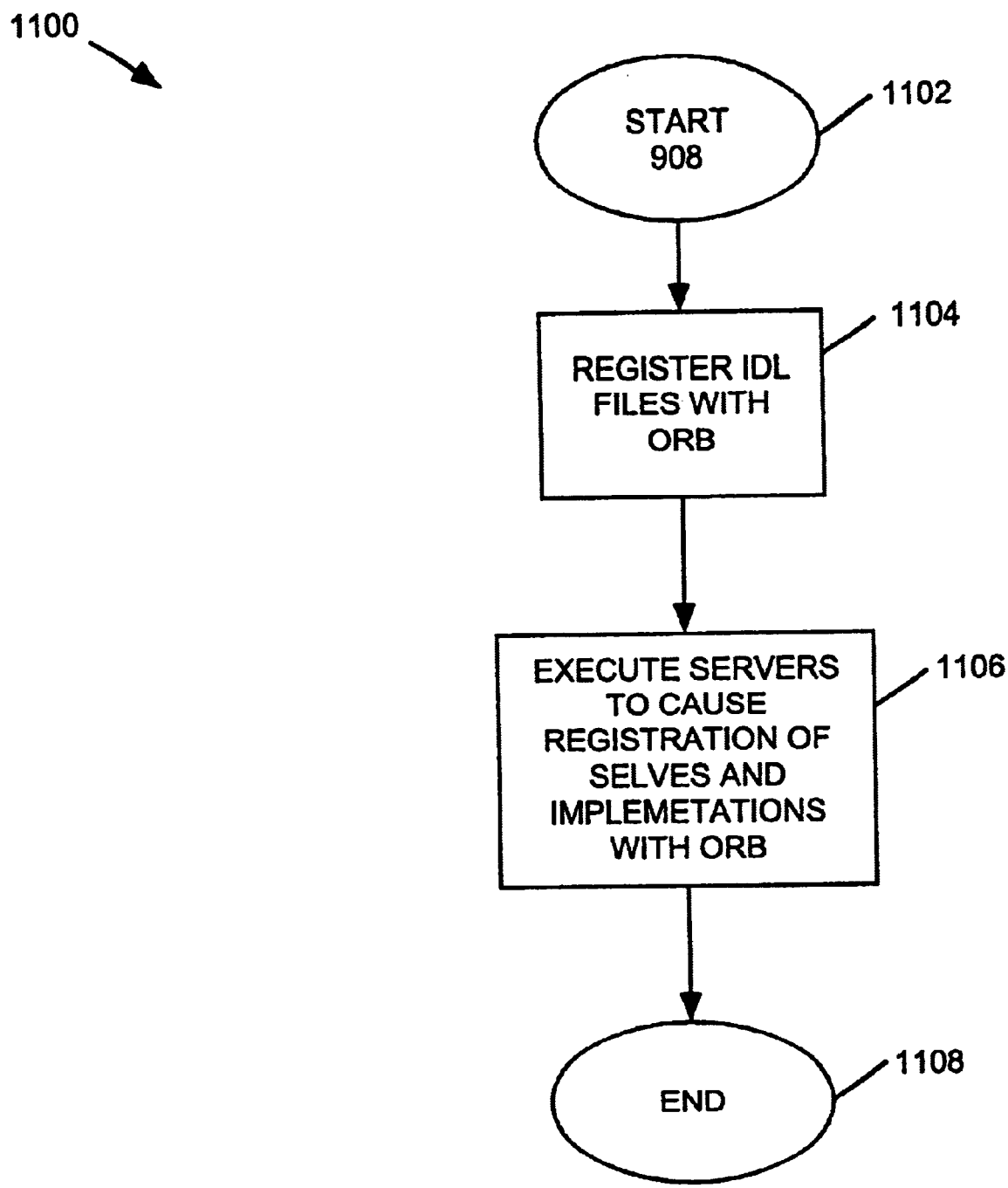
FIG. 11 is a flowchart illustrating in greater detail the registration step 910 of FIG. 9.

The interface registration step 908 of FIG. 9 is illustrated in greater detail at FIG. 11. Beginning at step 1102, the interface definition files are first registered with the object request broker by loading the appropriate IFR file at step 1104. At step 1106 the servers are executed to cause thereby registration of themselves and their implementations with the ORB. The sequence terminates at step 1108.

With respect to registration steps 908 and 910, it will be appreciated that the actual operations required to register an object will vary depending on the details of the operating system and ORB being used. In one embodiment, the object is registered with both the ORB and the operating system. With respect to the ORB, registration preferably includes depositing with the ORB the interface definitions, the implementation definitions and the definitions of the server programs. This provides to the ORB the requisite information for the ORB to locate the correct skeleton for the server. Registration is described in more detail in co-pending U.S. patent application Ser. No. 08/408,645.

Figure 12:
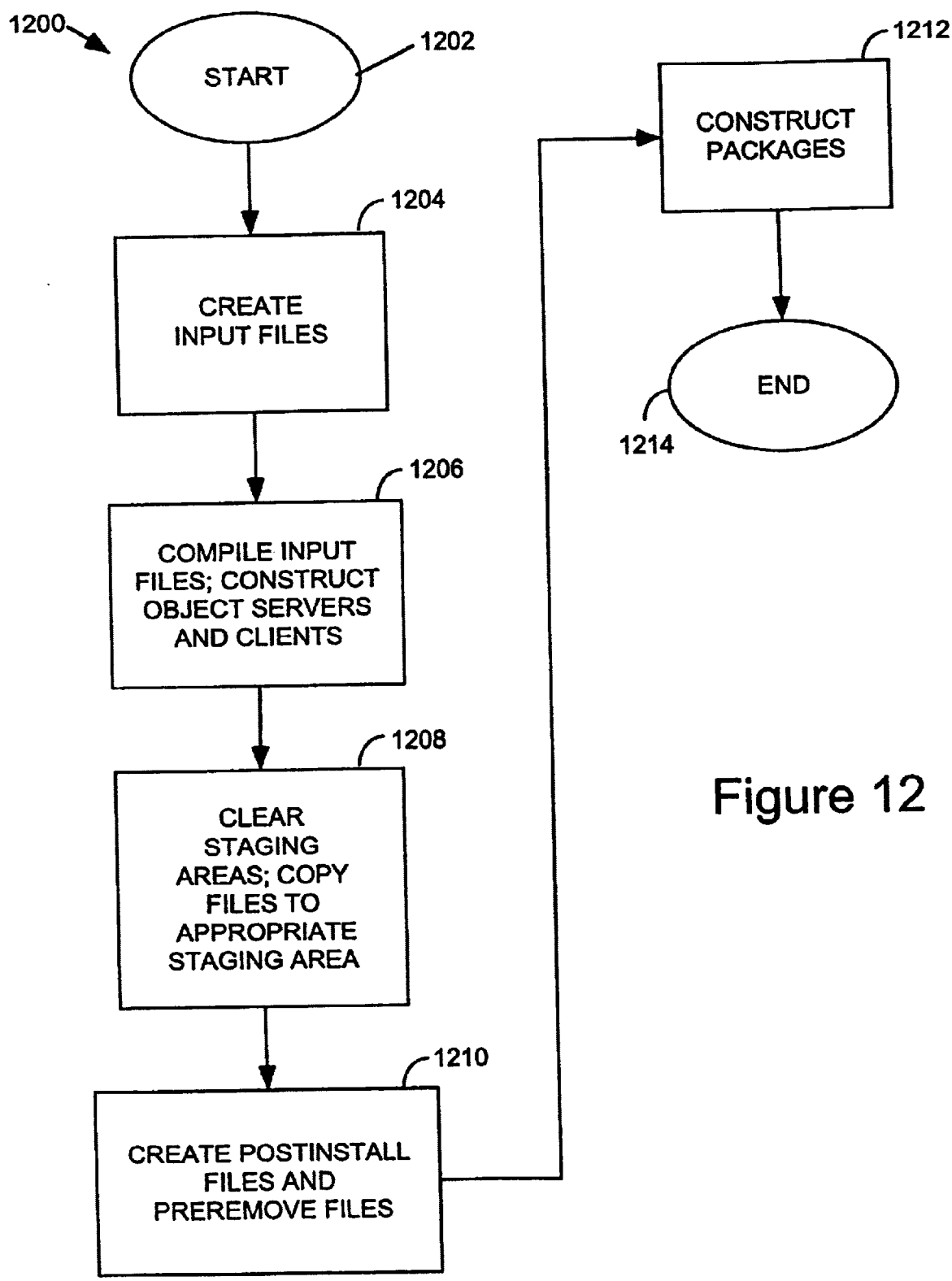
FIG. 12 is a flowchart illustrating the deployment of a distributed object in a distributed object system.

The registration of objects which are to be deployed on the distributed object system for general use (not development) is described with respect to FIG. 12 at 1200. Beginning at initial step 1202, the input files are created for the "deployed object" at step 1204 in the same manner described above. These are the same input files described above with respect to development objects and clients. The files are compiled and object servers and clients are constructed at step 1206, again as substantially described above, except that no renaming of the interface, or file or search paths is performed and no special object file is linked as for development objects.

At step 1208 the staging areas, areas of memory allocated for storing the installable files associated with the objects, are cleared. For each subdirectory described in the make files, the installable files for each component are copied to the appropriate staging area and scripts are constructed as described below. This step can be performed using standard techniques.

At step 1210 the following sequence of operations is performed. For each interface definition file, a postinstall shell script fragment is generated that runs the interface definition file compiler to load an IFR file associated with that interface. This fragment file is placed in an appropriate staging area. For each server, a postinstall shell script fragment is generated that runs the server with a special command to cause installation of the server and its implementations with the ORB and to create and register any factory objects. In addition, a preremove shell script fragment is generated that kills, holds down and unregisters the server and optionally deletes the associated data factory. These fragment files are also placed in the appropriate staging area. In addition, a postinstall fragment is generated that creates the directory used for the server's data files and placed in an appropriate staging area. These steps can be performed using methods well known to those having skill in the art.

At step 1212, the postinstall file fragments generated as described above are concatenated together along with a script to form a package postinstall script for each package defined in the make files. This concatenation is performed in a order such that the fragments generated from the interface definition files are registered before the interfaces that inherit from them. Preferably, the developer can include a postinstall script file or write a replacement file. In addition, for each package a package preremove script is created that includes the above-described preremove fragments. Preferably, the developer can include a preremove script or write a replacement file. For each declared package, a package containing the distributed object having the above-described inheritance structure and which is capable of operating on the distributed object system is then constructed using the provided and generated package definition files and the installable files in the associated staging area. These steps can be performed using methods well known to those having skill in the art. The sequence of operations then terminates at step 1214.

Thus, it will be seen that the present invention provides a method and apparatus for creating and installing distributed objects on a distributed object system in which support for the distributed object system is built into the distributed object in a highly transparent manner. Using the method and apparatus of the invention, objects currently available that do not support the features of a distributed object system can be installed on such a system without extensive rewriting of the object's code. In addition, using the present invention programmers and users who are not familiar with distributed objects can develop such objects and/or take advantage of distributed object systems without undue difficulty.

Although the foregoing invention has been described in some detail for purposes of clarity of understanding, it will be apparent that certain changes and modifications may be practiced within the scope of the appended claims.

What is claimed:

1. A computer-implemented method for creating a distributed object suitable for use on a distributed object system, comprising:
   providing
      interface files describing interfaces contained in the distributed object,
      implementation files describing distributed object implementations,
      servant class files describing a servant class of object implementations, and
   compiling under computer control the interface, implementation and servant class files to produce compiled header and source files corresponding to said interface, implementation and servant class files, wherein the source files corresponding to the implementation files include template source files; and
   linking under computer control the header and source files with a wrapper class containing functions and services for operating the distributed object on the distributed object system, so that the wrapper class has an inheritance relationship with respect to the servant class, wherein the inheritance relationship is such that the wrapper class inherits from the servant class to create thereby a distributed object configured to operate on said distributed object system.

2. The computer-implemented method of claim 1, wherein the template source files contain a prototypical version of the servant class.

3. The computer-implemented method of claim 1, further including the steps of providing an interface class of interfaces for selected services in the wrapper class and linking the servant class to the interface class so that the servant class inherits from the interface class.

4. The computer-implemented method of claim 3, wherein the interface class is a pure class.

5. The computer-implemented method of claim 1, further including the step of wrapping calls to developer-defined functions in the servant class with wrapper statements.

6. The computer-implemented method of claim 1, further including the step of providing under computer control at least one shared library comprising code used by the distributed object.

7. The computer-implemented method of claim 1, further including the step of distinguishing distributed objects suitable for development purposes from distributed objects suitable for deployment on the distributed object system using a computer controlled discrimination mechanism.

8. The computer-implemented method of claim 7, wherein the step of distinguishing further includes the step of linking under computer control a development object file with the header and source files when the distributed object is suitable for development purposes.

9. The computer-implemented method of claim 7, wherein the step of distinguishing further includes the steps of
   a) producing under computer control an interface registry file for registering deployed distributed objects with the object request broker mechanism; and
   b) packaging under computer control the deployed distributed object in a package device
when the distributed object is suitable for deployment purposes.

10. The computer-implemented method of claim 1, wherein the computer-implemented method is performed on a computer residing on a distributed object system which includes a plurality of networked computers having memories in which reside other distributed objects and which distributed object system further includes an object request broker mechanism and an object adapter mechanism.

11. The computer-implemented method of claim 10, further including the step of providing an object adapter interface class for each interface registered with the object request broker mechanism.

12. The computer-implemented method of claim 11, further comprising the step of registering under computer control the distributed object and the implementations of the distributed object with the object request broker mechanism to enable the distributed object to communicate with the resident distributed objects.

13. The computer-implemented method of claim 10, wherein the services in the wrapper class provide a computer controlled interface mechanism between the methods contained in the servant class of objects and the object request broker mechanism.

14. The computer-implemented method of claim 13, wherein the wrapper class includes object lifecycle services, object request broker and object adapter services, registration services, multithreading services, subobject services, refdata services, reaper services, object reference services and tracing and logging services.

15. The computer-implemented method of claim 14, wherein said lifecycle services include object creation functions, object deletion functions, object activation functions, object deactivation functions, server startup functions, server shutdown functions and server installation functions.

16. The computer-implemented method of claim 14, wherein said registration services include functions for registering an object on said object request broker mechanism, unregistering an object on said object request broker mechanism, and finding a service provided by said object request broker mechanism.

17. The computer-implemented method of claim 1, further including the step of providing persistent data schema files describing persistent data.

18. The computer-implemented method of claim 17, wherein said step of compiling provides header and source files corresponding to said persistent data schema files.

19. A distributed object produced by the computer-implemented method of claim 1.

20. A computer system for producing a distributed object suitable for use on a distributed object system, comprising:
   a compiling mechanism for compiling
      an interface definition file including object interface definitions, an implementation file describing distributed object implementations and servant class files of developer-defined object implementations arranged to produce corresponding header and source files; and a linking mechanism effective to link the source and header files produced by the compiling mechanism with a wrapper class containing functions and services for operating the distributed object on the distributed object system, wherein the linker is effective to establish an inheritance relationship between the wrapper class and the servant class, wherein the wrapper class inherits from the servant class to create thereby a distributed object configured to operate on said distributed object system.

21. The computer system of claim 20, wherein the compiling and linking mechanisms are effective to produce a template file containing a prototypical version of the servant class.

22. The computer system of claim 20, further including an interface class containing interfaces for services contained in the wrapper class and wherein the compiling and linking mechanisms are effective to establish an inheritance relationship between the interface and servant classes in which the servant class is derived from the interface class.

23. The computer system of claim 20, wherein the compiling and linking mechanisms are effective to wrap calls to developer-defined functions in the servant class with wrapper statements.

24. The computer system of claim 20, wherein the compiling and linking mechanisms are effective to produce header and source files corresponding to input files including interface definition files, implementation files and the servant class files and the linker is effective to link the header and source files with the wrapper class to produce the distributed object.

25. The computer system of claim 20, further including a discrimination mechanism for distinguishing between distributed objects to be used for development purposes from distributed objects to be deployed on the distributed object system.

26. The computer system of claim 25, wherein the compiling and linking mechanism is effective to link a development object file with the header and source files produced by the compiling and linking mechanism when the distributed object is to be used for development purposes.

27. The computer system of claim 25, further including a registration mechanism for registering the distributed object with the object request broker mechanism under computer control an interface registry file associated with the distributed object and a packaging mechanism for producing the distributed object in a package when the distributed object is to be deployed on the distributed object system.

28. The computer system of claim 20, wherein the computer system comprises a computer on a distributed object system including a plurality of networked computers having memories in which reside other distributed objects, which distributed object system further includes an object request broker mechanism and an object adapter mechanism.

29. The computer system of claim 28, further including an object adapter interface class for each distributed object registered with the object request broker mechanism and the compiling and linking mechanism is effective to create an inheritance relationship between the wrapper class and the object adapter interface class wherein the wrapper class is derived from the object adapter interface class.

30. A distributed object produced using the computer system of claim 20.

31. A distributed object suitable for use on a distributed object system, comprising:

a call to a developer-written function contained in a developer-written servant class of objects; and wrapper statements contained in a wrapper class of objects, which wrapper class has an inheritance relationship with the servant class, wherein the wrapper class inherits from the developer-written servant class of developer-written objects, the wrapper statements including services for supporting the operation of the distributed object on the distributed object system.

32. The object of claim 31, wherein the developer-written servant objects inherit object attributes through an inheritance relationship with an interface class of objects that contains interfaces for selected services in the wrapper class.

33. The object of claim 32, wherein the interface class of objects is a pure class that comprises interfaces to services in the wrapper class.

34. The object of claim 31, wherein the object is located in the memory of a computer coupled with a network of computers that comprises a distributed object system containing distributed objects, wherein said distributed objects communicate using an object request broker mechanism.

35. The object of claim 34, wherein the wrapper class of objects provides an interface mechanism between the methods contained in the developer-written class of objects and the object request broker mechanism.

36. The object of claim 35, wherein said wrapper functions include object lifecycle functions, object request broker and object adapter functions, registration functions, multithreading functions, subobject functions, refdata functions, reaper functions, object reference functions and tracing and logging functions.

37. The object of claim 36, wherein said lifecycle functions include object creation functions, object deletion functions, object activation functions, object deactivation functions, server startup functions, server shutdown functions and server installation functions.

38. The object of claim 36, wherein said registration functions include functions for registering an object on said object request broker mechanism, unregistering an object on said object request broker mechanism, finding a service provided by said object request broker mechanism and finding all services provided by said object request broker mechanism.

39. The object of claim 34, wherein said object is a development distributed object.

40. The object of claim 34, wherein said distributed object is a deployed distributed object.

41. The object of claim 31, wherein said object is contained in a runtime package mechanism installed in said memory of said computer.

42. The object of claim 31, wherein said object includes a spy object device for implementing system administration functions.

43. The object of claim 31, wherein functions contained in said developer-written servant class of objects are wrapped by said wrapper functions.

* * * * *